(12) United States Patent
Holz et al.

(10) Patent No.: US 10,444,847 B2
(45) Date of Patent: Oct. 15, 2019

(54) STABILIZING CONTENT DISPLAY ON WEARABLE DEVICES

(71) Applicant: OATH INC., New York, NY (US)

(72) Inventors: Christian Holz, San Francisco, CA (US); Rajiv Ayyangar, San Francisco, CA (US)

(73) Assignee: OATH INC., New York, NY (US)

( * ) Notice: Subject to any disclaimer, the term of this patent is extended or adjusted under 35 U.S.C. 154(b) by 775 days.

(21) Appl. No.: 14/587,888

(22) Filed: Dec. 31, 2014

(65) Prior Publication Data

US 2016/0189351 A1 Jun. 30, 2016

(51) Int. Cl.

| H03F 1/26 | (2006.01) |
|---|---|
| G06F 3/01 | (2006.01) |
| G06F 1/16 | (2006.01) |
| G06F 3/0488 | (2013.01) |
| G06F 3/038 | (2013.01) |
| G09G 5/00 | (2006.01) |
| G06F 3/0346 | (2013.01) |
| G06F 3/0484 | (2013.01) |
| G06F 3/0485 | (2013.01) |

(52) U.S. Cl.
CPC ............ *G06F 3/017* (2013.01); *G06F 1/163* (2013.01); *G06F 1/1694* (2013.01); *G06F 3/038* (2013.01); *G06F 3/0346* (2013.01); *G06F 3/0485* (2013.01); *G06F 3/0488* (2013.01); *G06F 3/04842* (2013.01); *G09G 5/00* (2013.01); *G09G 2320/0261* (2013.01); *G09G 2340/0464* (2013.01)

(58) Field of Classification Search
CPC .... G01N 2201/12; G01N 21/55; G06F 3/017; G06F 1/163; G06F 3/0346
USPC ........................................................ 702/189
See application file for complete search history.

(56) References Cited

U.S. PATENT DOCUMENTS

| 2007/0171190 A1* | 7/2007 | Wang .................... G06F 3/0346 345/156 |
|---|---|---|
| 2012/0229455 A1* | 9/2012 | Hayashi .................. A63F 13/44 345/419 |
| 2014/0092040 A1* | 4/2014 | Nagao .................. G06F 1/1694 345/173 |

* cited by examiner

*Primary Examiner* — Toan M Le
*Assistant Examiner* — Xiuqin Sun
(74) *Attorney, Agent, or Firm* — James J. DeCarlo; Greenberg Traurig, LLP

(57) ABSTRACT

Stabilization of content displays in a wearable device when the wearer is in motion is disclosed. The acceleration and rotation forces acting on the wearable device are obtained. The forces acting on the body part bearing the wearable device are modeled. One or more offsets to counteract the forces are determined based on the models. The offsets are applied to the content display shown on the wearable device.

15 Claims, 12 Drawing Sheets

US 10,444,847 B2

STABILIZING CONTENT DISPLAY ON WEARABLE DEVICES

BACKGROUND

The improvements in miniaturization of memory hardware and data compression software have enabled development of wearable computing devices. Simple objects such as eye glasses and watches come equipped with processors and memories to be used as wearable computing devices. Such wearable computing devices enhance convenience and efficiency by providing content on the go. With a simple glance, users consume content wherever they are and whatever they may be doing—be it sitting, standing, walking or jogging. Smaller wearable computing devices such as smartwatches can present notifications and messages like directions for quick easy consumption.

SUMMARY

This disclosure relates to systems and methods for stabilizing content display on wearable devices. A processor-executable method for stabilizing content display is disclosed in some embodiments. The method comprises receiving, by a processor, data indicative of motion from an motion sensor of a wearable computing device mounted on a body portion of a wearer and detecting from the motion sensor data, by the processor, prospective acceleration of the computing device displaying at least a first portion of a content display on the display screen of the wearable device. The method further comprises determining, by the processor, a perspective transformation for the content display to correct for displacement of the display screen relative to the wearer's view due to the prospective acceleration.

In some embodiments, the perspective transformation comprises an offset displacement wherein a determination of magnitude and direction for the offset is based at least on the detected prospective acceleration. The method further comprises stabilizing, by the processor, the content display by smoothing noise in the motion sensor data and dragging the first content display portion by the offset in the determined direction, the first content display portion being relocated proximate to a center of the display screen as a result of the dragging thereby compensating for the prospective acceleration when it occurs.

In some embodiments, dragging, by the processor, the first content display portion by the offset in the determined direction is based on hysteresis wherein the first content display is offset by a fraction of a difference to a prior offset. The offset of the first content display is updated at a refresh rate of the motion sensor data. In some embodiments, a Kalman filter with a predictive component is employed by the processor for the smoothing and for determining the direction for the offset. In some embodiments, the magnitude of the offset further comprises applying, by the processor, a constant spring factor as at least a portion of the offset.

In some embodiments, the method comprises further detecting, by the processor, a first oscillatory motion of at least the body portion bearing the wearable computing device thereon, analyzing, by the processor, the first oscillatory motion based on a mass-spring-damper model comprising at least one spring modeling the body portion, a current position indicative of a displacement from a mean position of the at least one spring. In some embodiments, determining the magnitude for an offset further comprises setting, by the processor, the magnitude for the offset based on a displacement of the at least one spring relative to the mean position and mapping, by the processor, the offset onto an off screen distance for providing continuous stabilization throughout the amplitude of the first oscillatory motion.

In some embodiments, the visible displacement of the first portion of the content display causes display of at least a second portion of the content display on the display screen wherein dragging the content display by the offset in the determined direction further comprises altering, by the processor, a display on the display screen from the second portion of the content display to the first portion of the content display. The first portion of the content display and the second portion of the content display comprise a complete display of a notification. In some embodiments, the at least second portion of the content display can comprise at least another third portion that is revealed upon further displacement of the content display in another direction different from the direction that displayed the second portion.

An apparatus comprising a processor and a non-transitory processor readable storage medium having stored thereon programming logic is disclosed in one embodiment. The programming logic comprises motion sensor data receiving logic, executed by the processor, to receive data indicative of motion from an motion sensor of the apparatus mounted on a body portion of a wearer. Detecting logic, is executed by the processor, to detect from the motion sensor data, prospective acceleration of the computing device displaying at least a first portion of a content display on the touchscreen. Transformation logic, is also executed by the processor, to determine based on the motion sensor data a perspective transformation of the content display to correct for displacement of the display screen relative to the wearer's view.

In some embodiment, the transformation logic comprises offset determining logic, executed by the processor, for determining magnitude and direction for an offset displacement of the content display based at least on the detected acceleration. The content display on the touchscreen is stabilized using the stabilizing logic comprised in the transformation logic also executed by the processor. In some embodiments, the stabilizing logic further comprises smoothing logic, executed by the processor, to smooth noise in the motion sensor data and dragging logic, executed by the processor, to drag the first content display portion by the offset in the determined direction, the first content display portion being relocated proximate to a center of the touchscreen as a result of the dragging.

In some embodiments, the apparatus further comprises a Kalman filter that smooths the noise in the motion sensor data and determines the direction for the offset. In some embodiments, the offset determining logic further comprises logic, executed by the processor, for applying a constant spring factor as at least a portion of the offset. In some embodiments, oscillatory motion detecting logic, is executed by the processor, for detecting a first oscillatory motion of at least the body portion bearing the apparatus thereon. Oscillatory motion analyzing logic, comprised in the apparatus is also executed by the processor, for analyzing the first oscillatory motion based on a mass-spring-damper model comprising at least one spring and a current position indicative of a displacement from a mean position of the at least one spring, the at least one spring modeling the body portion. In some embodiments, offset determining logic further comprises setting logic, executed by the processor, for setting the magnitude for the offset based on a displacement of the at least one spring relative to the mean position and mapping logic, also executed by the processor, for mapping the offset onto an off screen distance for providing continuous stabilization throughout the amplitude of the first oscillatory motion.

A computer readable storage medium comprising processor-executable instructions is disclosed in an embodiment. The computer readable medium comprises instructions for receiving data indicative of motion from a motion sensor of a wearable computing device mounted on a body portion of a wearer wherein the wearable computing device further comprises a display screen. The medium further comprises instructions for detecting from the motion sensor data, prospective acceleration of the computing device displaying at least a first portion of a content display on the display screen, and for determining a perspective transformation to correct for displacement of the display screen relative to the wearer's view. In some embodiments, the instructions for determining the perspective transformation further comprising instructions for determining magnitude and direction for an offset displacement based at least on the detected acceleration and instructions for stabilizing the content display on the display screen. The instructions for stabilizing the content display further comprise instructions for smoothing noise in the motion sensor data and instructions for dragging the first content display portion by the offset in the determined direction, the first content display portion being relocated proximate to a center of the display screen as a result of the dragging. The instructions for determining the magnitude of the offset further comprise instructions for applying a constant spring factor as at least a portion of the offset.

In some embodiments, the non-transitory storage medium further comprises instructions for further detecting a first oscillatory motion of at least the body portion bearing the wearable computing device thereon and analyzing the first oscillatory motion based on a mass-spring-damper model comprising at least one spring, a current position indicative of a displacement from a mean position of the at least one spring, the at least one spring modeling the body portion. In some embodiments the instructions for determining the magnitude for an offset further comprising instructions for setting the magnitude for the offset based on a displacement of the at least one spring relative to the mean position and for mapping the offset onto an off screen distance for providing continuous stabilization throughout the amplitude of the first oscillatory motion.

A method of executing a command corresponding to a user input is disclosed in some embodiments. The method comprises receiving, by a processor, data indicative of motion of a body from an motion sensor comprised in a wearable computing device mounted on the body, the wearable computing device further comprising a display screen, detecting from the motion sensor data, by the processor, at least the accelerations of the body and determining a magnitude and direction of the accelerations. The method further comprises determining, by the processor, if the motion of the body portion is an intentional user gesture corresponding to a first user input. If the motion of the body portion is an intentional user gesture, the method further comprises identifying, by the processor, a command associated with the first user input and executing, by the processor, the identified command in response to the first user input.

In some embodiments, the command can be a change display command and a content display on the display screen is altered to show off-screen portion of the content display in response to the first user input. In some embodiments, the command can be a snooze alarm command and an alarm on the wearable device is snoozed in response to the first user input. In some embodiments, the command can be a dismiss notification command and a notification being removed from the display screen in response to the first user input.

In some embodiments, the method comprises receiving, by the processor, a second user input via a user's touch on the display screen. The identified command comprises a zoom-in display command that zooms in to magnify content displayed on the display screen if the direction of the acceleration is towards the user. The identified command comprises a zoom-out display command that zooms out on content displayed on the display screen if the direction of the acceleration is away from the user.

An apparatus comprising a processor, a touchscreen and a non-transitory processor readable storage medium having stored thereon programming logic for executing tasks based on user gesture input is disclosed in some embodiments. The programming logic comprises, motion data receiving logic, executed by the processor, for receiving data indicative of motion of a body from an motion sensor comprised in a wearable computing device mounted on the body. Detecting logic, is executed by the processor, for detecting from the motion sensor data, by the processor, at least the accelerations of the body. Acceleration determining logic, comprised in the apparatus is executed by the processor, for determining a magnitude and direction of the accelerations from the motion sensor data. Determination if the motion of the body portion is an intentional user gesture corresponding to a first user input is obtained via executing motion determining logic, by the processor. If the motion of the body portion is an intentional user gesture: identifying logic, is executed by the processor, for identifying a command associated with the first user input and the apparatus further comprises logic for executing, by the processor, the identified command in response to the first user input.

In some embodiments, the apparatus comprises logic for altering a content display on the display screen to show off-screen portion of the content display in response to the first user input that corresponds to a change-display command. In some embodiments, the apparatus comprises logic for snoozing an alarm on the apparatus, executed by the processor, in response to the first user input that corresponds to a snooze-alarm command. In some embodiments, the apparatus comprises logic for removing a notification from the display screen, executed by the processor, in response to the first user input that corresponds to a dismiss-notification command.

In some embodiments, the apparatus comprises a second input receiving logic, executed by the processor, for receiving a second user input via a user's touch on the display screen. The apparatus comprises logic executed by the processor for zooming in to magnify content displayed on the touchscreen when the identified command comprises a zoom-in display command and the direction of the acceleration is towards the user. The apparatus also comprises logic executed by the processor for zooming out on content displayed on the touchscreen when the identified command comprises a zoom-out display command and the direction of the acceleration is away the user.

A non-transitory computer readable storage medium, comprising processor-executable instructions is disclosed in one embodiment. The medium comprises instructions for receiving data indicative of motion of a body from an motion sensor comprised in a wearable computing device mounted on the body and for detecting from the motion sensor data at least the accelerations of the body. The medium further comprises instructions for determining a magnitude and direction of the accelerations from the motion sensor data and determining if the motion of the body portion is an intentional user gesture corresponding to a first user input. If the motion of the body portion is an intentional user gesture, then instructions are comprised in the medium for identifying a command associated with the first user input and for executing the identified command in response to the first user input.

These and other embodiments/will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
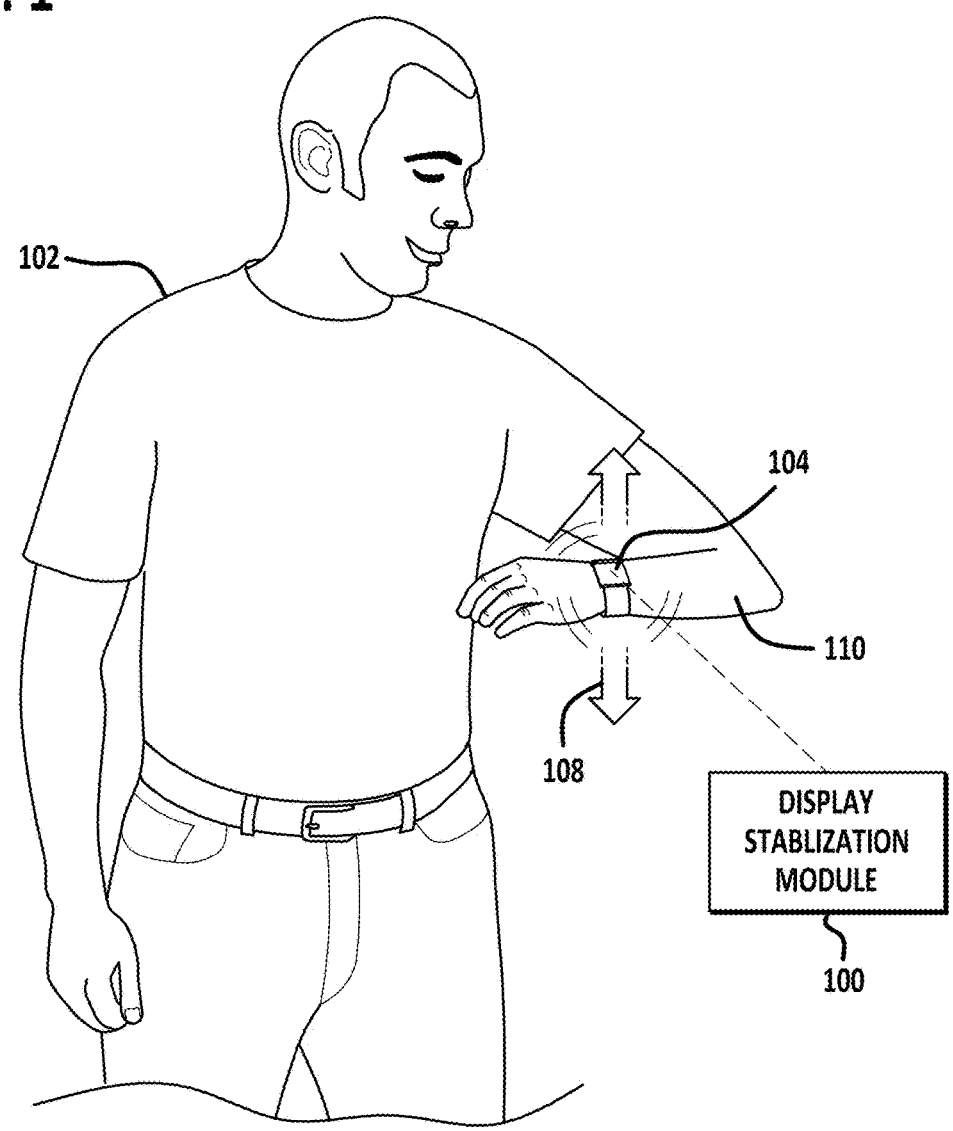
FIG. 1 shows a wearer in motion having a smartwatch on her hand.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments are described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While wearable computing devices such as smartwatches are becoming increasingly popular as sources that provide quick, easy-to-grasp content on the go, consuming rich content when a user or a wearer who wears the device is moving is a difficult task. Watch screens have a small size and reading them while moving can be very challenging. FIG. 1 shows a wearer 102 of a smartwatch 104 in motion. Acceleration forces propagate through the body of the wearer 102 which moves around the wearable device 102 mounted on a portion or hand 110 of the wearer's body and impedes stable reading as they induce acceleration forces 108 within the wearable device. As seen from data presented further infra, this problem is less evident on mobile devices that users hold in their hands, since they counteract accelerations using the dexterity of their fingers and hand. Such stabilization is more difficult on wrist-worn computing devices because all forces need to originate from a user's shoulder and arm which are inherently coarser. This commonly forces users to stop their current activity for reading tasks that go beyond looking at the time such as incoming text messages or directions that are more complex than a simple arrow. Embodiments disclosed herein provide for a display stabilization module 100 that can be incorporated into the smartwatch 104 to stabilize displayed contents to support reading tasks in motion.

The display stabilization module 100 stabilizes displayed content to support reading tasks when the wearer 102 is in motion. In some embodiments, the display stabilization module 100 measures the acceleration and rotation forces that act on the wearable device 104 throughout the body, reconstructs and models the motion forces acting on the wearer's arm 110 and body and adjusts the content displayed on the screen to counteract device motions from the wearer's perspective. Apart from enhanced stability, the data from the display stabilization module 100 can be used for other purposes such as enlarging content that is displayed on the screen and leveraging motion of the wearable computing device 104 to show parts of the GUI that may be off-screen but come into view because of the wearer's 102 body motion, for example, like a peephole display.

Moreover the display stabilization module 100 can also be enabled to measure sharp spikes in acceleration, map them to specific user gestures that the wearer 102 may employ to provide specific input or command to the wearable computing device 104. This alleviates the need for the user to provide touch input in motion which can be difficult or using speech which can be suboptimal while running or walking outdoor environments.

Generally, solutions to stabilize displays in imaging systems such as cameras comprise sensors and/or physical motors to counter the motion or vibration of the imaging system. The display stabilization module 100 which operates in accordance with embodiments detailed herein eliminates the need to incorporate additional hardware to stabilize displays. Furthermore, the display stabilization module 100 comprises code modules executed by a processor and stored on a processor-readable storage medium and hence the display stabilization module 100 can contribute to keeping the weight low in the wearable device 104 while at the same time providing functionality facilitated by weightier hardware solutions.

Figure 2:
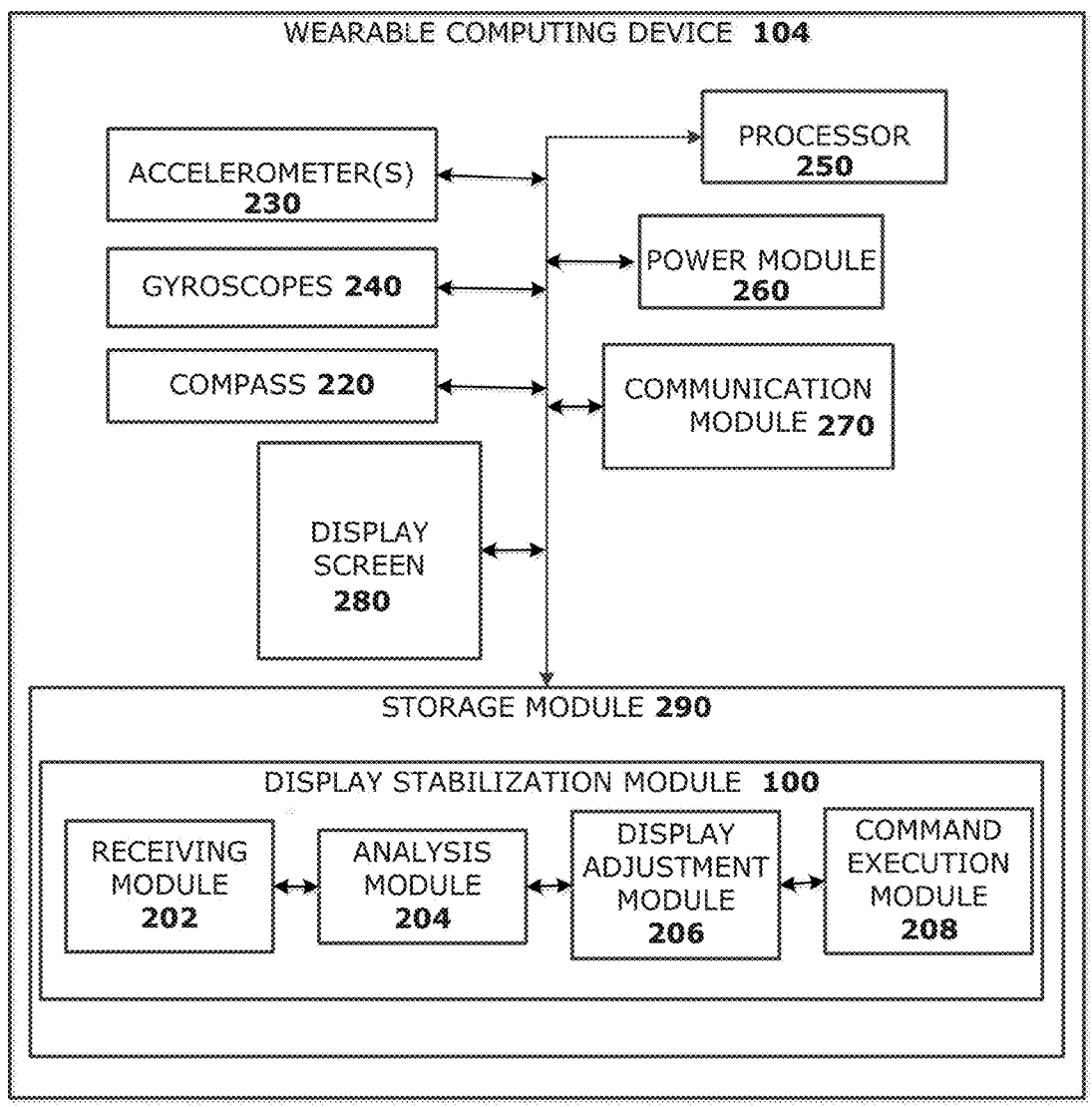
FIG. 2 is a schematic diagram of the wearable computing device comprising a display stabilization module in accordance with some embodiments.

FIG. 2 is a schematic diagram of the wearable computing device 104 comprising a display stabilization module 100 in accordance with some embodiments. It may be appreciated that the details of wearable device 104 is described herein only by the way of illustration and not non-limiting example and that the display stabilization module 100 as described herein can be incorporated into any computing device which can comprise more or less components and attached to a moving object where content display stabilization may be desired.

The circuitry of the wearable device 104 runs on the energy from the power module 260 or other power source. The wearable device 104 can additionally comprise a processor 250, communication module 270, one or more accelerometers 230, one or more gyroscopes 240 and/or a compass 220 and a display screen 280 which may be a touchscreen. The wearable device 104 further comprises a storage module 290 which can comprise volatile and non-volatile processor-readable storage media. The various elements of the wearable device 104 are communicatively coupled to each other. The communication module 270 is configured for wireless communication via NFC (Near Field Communication), Bluetooth and WiFi with local networks and the Internet. Further, the various modules of comprised in the storage medium 270 are communicatively coupled to each other to facilitate transfer of data from one module to another.

As discussed supra, the display stabilization module 100 can comprise sub-modules saved to the storage module 290 and executed by or incorporated in the processor 250 in order to stabilize content shown on the display screen 280. The processor 250 retrieves and executes instructions/program logic or modules such as the display stabilization module 100 in order to carry out the content display stabilization in accordance with embodiments detailed herein. The image stabilization module 100 comprises a receiving module 202, an analysis module 204, a display adjustment module 206 and a command execution module 208 that are communicatively coupled to each other. The receiving module 202 is configured to receive data regarding the accelerating forces acting on the wearable device 104 in some embodiments. By the way of illustration and not limitation, such data regarding the forces acting on the wearable device 104 can be obtained via the data from the accelerometer 230 comprised in the wearable device 104, or other motion or position sensing devices or components such as but not limited to gyroscopes.

The acceleration data from the receiving module 202 is transmitted to the analysis module 204 for analysis in order to analyze and identify the various forces acting on the wearable device 104. Generally the wearer 102 may have various stages of motion which can include being at rest, slow walking, fast walking, jogging and running. In addition, when the wearer 102 wants to view the display screen 280 of the wearable device 104 such as a smart watch attached to his/her hand, he/she has to swing the hand up with the face of the watch turned towards him/her. The wearable device 104 as a result is subjected to jitter due to the constant up/down motion of the wearer's body when walking/jogging/running and further subjected to oscillatory forces due to the swing of the wearer's arm when walking/jogging/running or when the arm is swung up to view the display screen 280 of the wearable device 104 as shown in FIG. 1. In some cases, the jitter can have multiple components, such as when the wearer 102 runs on a treadmill.

The analysis module 204 can be configured to analyze the data from the accelerometers 230 to identify the various components in the acceleration of the wearable device 104 caused due to each of these forces. In some embodiments, motion separation algorithms currently known in the art or to be invented can be implemented in accordance with embodiments described herein to identify the various component forces acting on the wearable device 104. In some embodiments, the wearable device 104 can be configured to recognize intentional gestures from the wearer in order to execute particular tasks. The intentional gestures can cause sudden spikes in the accelerometer data. When such spikes are detected, the motion classification routine executed by the analysis module 204 transmits the accelerometer data to the command execution module 208 for further processing to identify any intentional user gestures and take actions if necessary, in accordance with embodiments herein. Moreover, the data from the accelerometers 230 commonly available on wearable devices tends to be very noisy. The display stabilization module 100 can be configured to compensate for low data quality from the accelerometer in accordance with further embodiments disclosed herein.

The display adjustment module 206 receives the acceleration data from the analysis module 204 and determines the adjustment to be made to the content display shown on the display screen 280 in order to compensate for the shakiness or jitter and oscillations caused by the various forces acting on the device. Embodiments of the display adjustment module 206 smooth the accelerations so that the content on the display screen 280 can become readable to the wearer 102. Generally users can achieve such smoothing on hand-held devices via clutching them with their fingers. However, in order to enhance or restore readability on wrist-mounted wearable devices such as the devices 104 (where no fine-grained motion can compensate for such forces), the display adjustment module 206 can be configured to apply one or more offsets to restore readability to a level achieved, for example, at or near that of hand-held devices.

In some embodiments, the display adjustment module 206 can be configured to implement a peephole display. If an application has a large area of content, only part of which is revealed at any given time, it is referred to as a peephole display. As the wearable device 104 is shaken due to the forces acting on it, the content can stay anchored while causing the display screen 280 to act as a window to the fixed background. In some embodiments, the peephole display capabilities of the wearable device 104 can be further employed to provide a readable view of notifications. For example, at any given time at least a portion of a notification is shown to the wearer 102 on the display screen 280. When the peephole display is implemented within the wearable device 104, movements of the wearable device 104 can reveal off-screen portions of the notification which appear merged due to the inherent nature of the human eyes thereby making the notification readable.

A command execution module 208 comprised in the display stabilization module 100 enables implementation of user interactions with the wearable device 104 in accordance with embodiments described herein. One-handed interactions can be implemented via the detection of spikes within the accelerometer data that can be indicative of intentional user gestures which can be mapped to specific commands. When the accelerometer data is combined with touch data from the display screen 280, it enables implementation of two-handed interactions by the command execution module 208. In some embodiments, the two-handed interactions can be used to implement various zoom levels on the content displays. The received interaction data from one or more inputs are combined to be mapped to specific commands which can be used by the processor 250 to execute respective tasks as defined by the command execution module 208.

Figure 3:
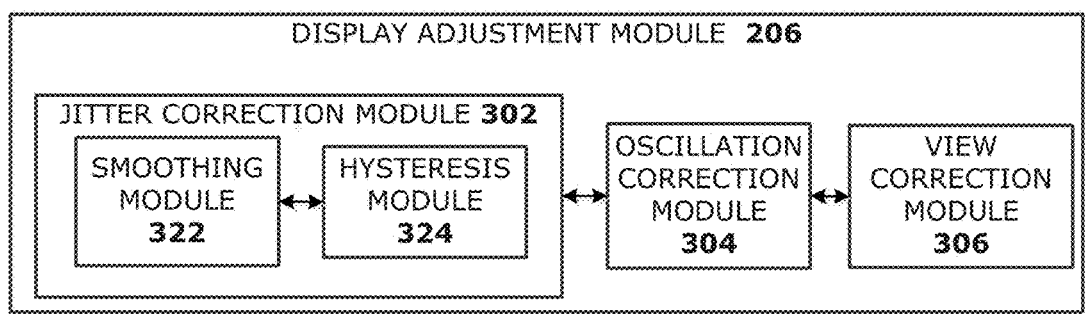
FIG. 3 is a schematic diagram of the display adjustment module in accordance with some embodiments.

FIG. 3 is a schematic diagram of the display adjustment module 206 in accordance with some embodiments. The display adjustment module 206 comprises a jitter correction module 302, oscillation correction module 304 and view correction module 306. As mentioned herein, the wearer's 102 motion induces jitter in the wearable device 104. In addition, the data output by the accelerometer 230 tends to be noisy. The various signals from the accelerometer are processed for motion classification by the analysis module 206. Accordingly, the compensation for the noise in the accelerometer data and the jitter is provided by the jitter correction module 302 while the compensation for the oscillatory motion is provided by the oscillation correction module 306.

The smoothing module 322 comprised within the jitter correction module 302 is configured to smooth the accelerations in order to avoid jarring offsets on a content display. In some embodiments, a Kalman filter with one-step-ahead predictor is used to smooth accelerations. In some embodiments, other filters currently know or to-be-invented can be used for smoothing. The predictive component of the Kalman filter can be used to anticipate or predict the acceleration from the wearer's perspective. The offset to apply to the content display being corrected can be determined to counteract such prospective acceleration The hysteresis module 324 further comprised in the jitter correction module 302 is configured to apply a constant spring factor to gradually drag the content shown on the display screen 280 back to the center. In the case where the wearer 102 does not move her arm 110 anymore but the screen is still offset, the screen contents can be animated back to the center of the display screen 280 by the hysteresis module 324. Upon the accelerations being smoothed, the screen contents are offset by a fraction of the difference to a prior offset with an added, very small offset to gravitate to the center. In some embodiments, the content display can be updated at the refresh rate of the accelerometer 230. In some embodiments, the update rates for the content display can be different. For example, the display can operate at 30 FPS (frames per second) or 60 FPS and the accelerometer 230 can provide data at 100 Hz or 200 Hz. In such embodiments, the display screen 280 need not update at the rate of the accelerometer but only at its own rate.

In some embodiments, the wearer's arm 110 that bears the wearable device 104 can be modeled as a single spring which can be an abstraction of a concatenation of three individual springs (shoulder, upper and lower arm). In some embodiments, the model of the arm 110 can be simplified into a mass-spring damper (MDS) model in two dimensions x and y. Below analysis shows the response in the x-dimension which can then be generalized to the y-dimension. Motion in this system can be described by:

$$M\frac{d^2x}{dt^2} + \gamma\frac{dx}{dt} + \kappa x = 0, \quad \text{Eq. (1)}$$

where x(t) is the position, M is the mass of the oscillation body, γ is the damping coefficient, k is the spring constant while M d²x/dt² is the driving force. When such oscillating motion is detected by the analysis module 204, the oscillation correction module 304 can be configured to generate an offset for the image that equals the inverse of the position which is −x(t). In some embodiments wherein the offset is higher than the total off-screen distance available for stabilization, −x(t) can be mapped onto the off-screen distance to provide continuous stabilization throughout the amplitude of motion.

In some embodiments, M, γ and k can be determined empirically and can be treated as equal for all the users. In some embodiments, these constants are determined empirically for each of the different types of motions such as but not limited to, walking, jogging, running and the like. The constants that need to be used with a given MDS model can be selected based on the motion classification data supplied by the analysis module 206. In some embodiments, two of the constants, for example, the damping coefficient γ and the spring constant k can be held fixed while the mass M of the oscillating body can be fit to the wearer 102 and motion type based on data from the accelerometer 230. It may be appreciated that only a single MDS model is discussed herein for brevity and that the wearer's 102 motion can include multiple oscillatory components of different frequencies which can be modeled into different MDS models which will each contribute to the content display offset in accordance with embodiments discussed herein.

The offset values obtained from the jitter correction module 302 and the oscillation correction module 304 are provided to the view correction module 306 which applies the received offsets to a content display of the wearable device 104 thereby providing a stabilized display to the wearer 102 who may be moving. In some embodiments, the total offset applied to a content display can comprise the constant spring factor from the jitter module 302 and the offset −x(t) from the oscillation correction module 304 combined linearly, for example, with weightage for each offset being learned empirically.

Figure 4:
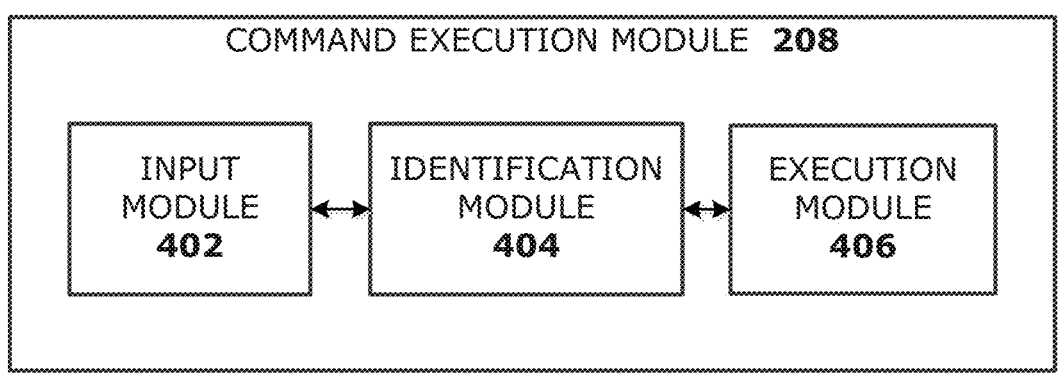
FIG. 4 is a schematic diagram of a command execution module in accordance with some embodiments.

FIG. 4 is a schematic diagram of a command execution module 208 in accordance with some embodiments. The command execution module 208 comprises an input module 402, an identification module 404 and task module 406. The input module 402 is configured to receive one or more inputs from one or more modules of the wearable device 104. One of the inputs received can be associated with sudden spikes detected by the analysis module 204 in the accelerometer data. In some embodiments, another input can be associated with data from other components of the wearable device such as, for example, the touchscreen 280. The received inputs are transmitted to the identification module 404 which maps predefined inputs to intentional user gestures that signify tasks to be executed by the processor 250. For example, predefined patterns of accelerometer data corresponding to particular arm movements can be associated with respective commands by the identification module 404. In some embodiments, the commands can require a second touch input in addition to the predefined accelerometer data pattern in order to execute a task. Thus, the intentional user gestures can comprise one handed interactions or two-handed interactions.

It may be further appreciated that if the wearable device 104 is equipped with audio components the accelerometer data can also be combined with voice input thereby expanding the inputs (and hence the variety of processor-executable tasks) that the wearer 102 can access. When the task to be executed is determined by the identification module 404, the execution module 406 signals the processor 250 to execute the determined task. By the way of illustration and not limitation, the one-handed gestures and related tasks that can be executed can include, performing a sharp movement of the arm to dismiss a notification or alarm or moving the arm around to navigate the peephole display. A non-limiting example of a two-handed gesture can be a wearer touching the display screen 2809 while moving the arm 110 up or down to zoom in or out on a display.

Figure 5:
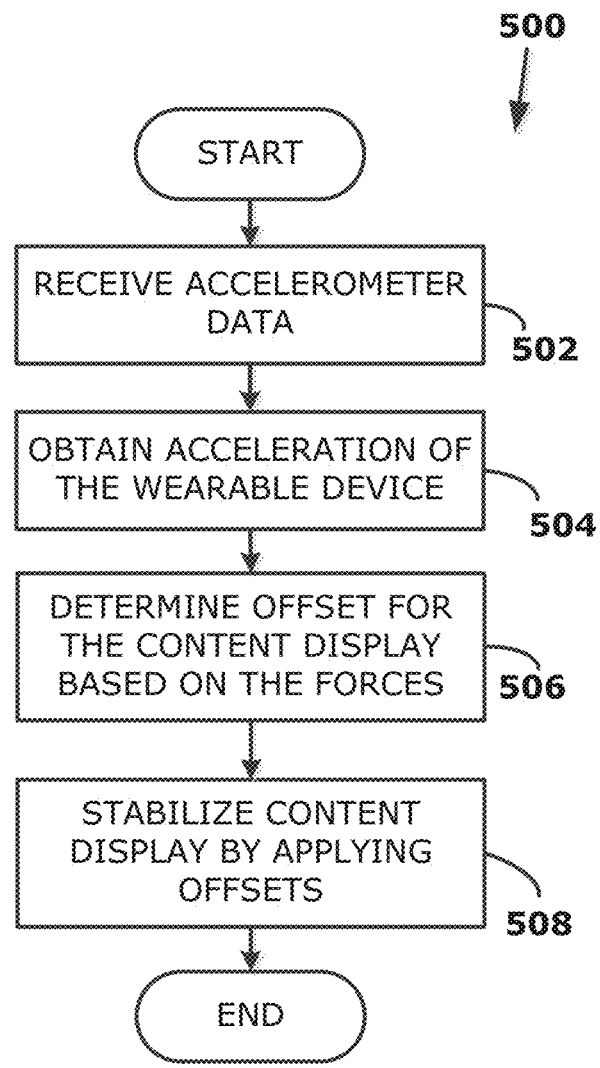
FIG. 5 is a flowchart that details a method of stabilizing content display on the wearable computing device in accordance with some embodiments.

FIG. 5 is an exemplary flowchart 500 that details a method of stabilizing a content display on the wearable computing device 104 in accordance with some embodiments. The method begins at 502 with a processor 250 of the wearable device 104 receiving accelerometer data indicative of motion of the wearable device 104 when it is mounted on a body portion such as the arm of a wearer 102. At 504, the acceleration of the wearable device 104 due to the motion of the wearer's body is obtained. As described supra, reading content shown on the display screen 280 of the wearable device 104 is difficult as the motion of the wearer's 102 body induces acceleration in the wearable device 104 attached to it which causes shakiness in the display screen 280 of the wearable device 104. Therefore, an offset to correct for displacement of the display screen 280 relative to the wearer's 102 view is determined at 506. In some embodiments, the determination of magnitude and direction for the offset is based at least on the acceleration. At 508, the offset thus determined is applied to the content display on the wearable device 104 thereby improving the readability of the content display to the wearer 102 who may be in motion. Thus, by applying offsets corresponding to the accelerations of the wearable device 104, the content display can be stabilized without the need for additional hardware normally used in view stabilization systems.

Figure 6:
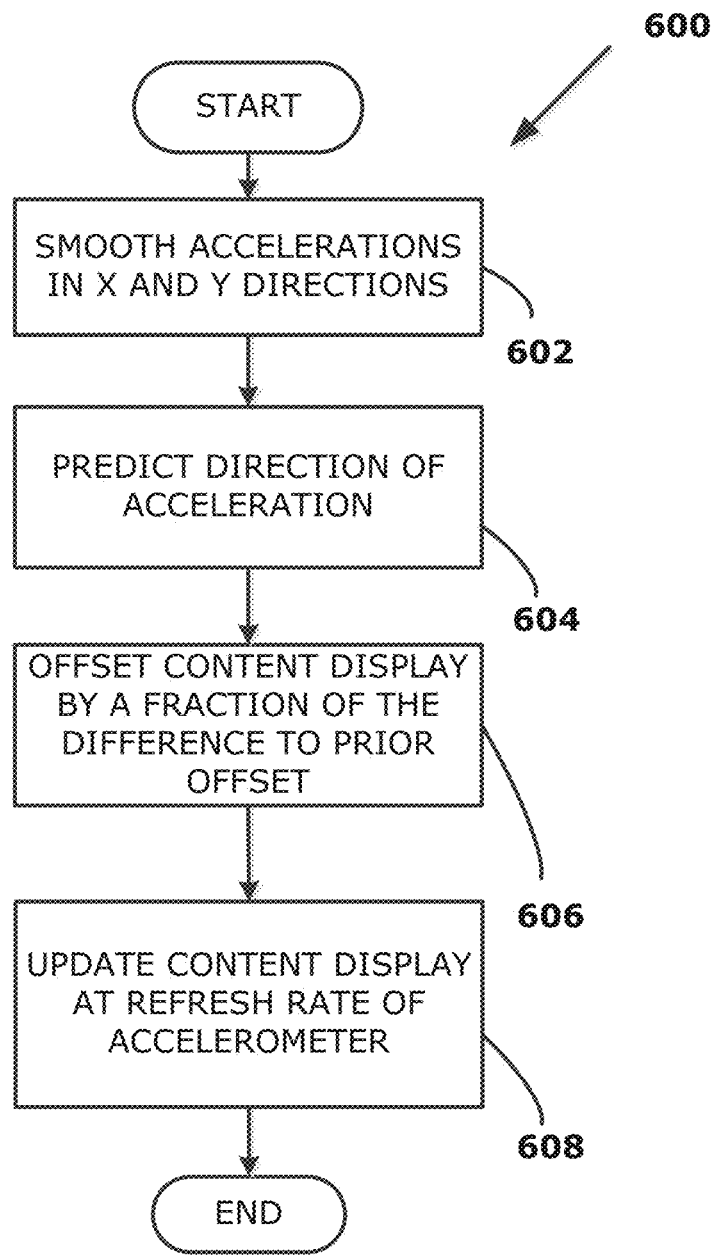
FIG. 6 is a flowchart that details a method of determining the offset to stabilize the content display on the wearable computing device in accordance with some embodiments.

FIG. 6 is a flowchart 600 that details a method of determining the offset to stabilize the content display on the wearable computing device in accordance with some embodiments. The method begins at 602 with smoothing accelerations in the x and y directions extending within the plane of the display screen 280. Smoothing the accelerations can avoid jarring offsets applied to the content display. By the way of illustration and not limitation, a Kalman filter with one-step-ahead predictor is used to smooth accelerations in some embodiments. The predictive component of the Kalman filter provides a direction of the acceleration at 604. The data from the accelerometer tends to be very noisy and hence an offset of a constant spring factor is gradually applied to drag the content display back to the center of the display screen 280. In some embodiments, hysteresis is used to achieve this effect so that at 606, the content display is offset only a fraction of the difference to a prior offset with an added very small offset to gravitate back to the center. The offset applied to the content display at 606 is updated at 608 at the refresh rate of the accelerometer data.

Figure 7:
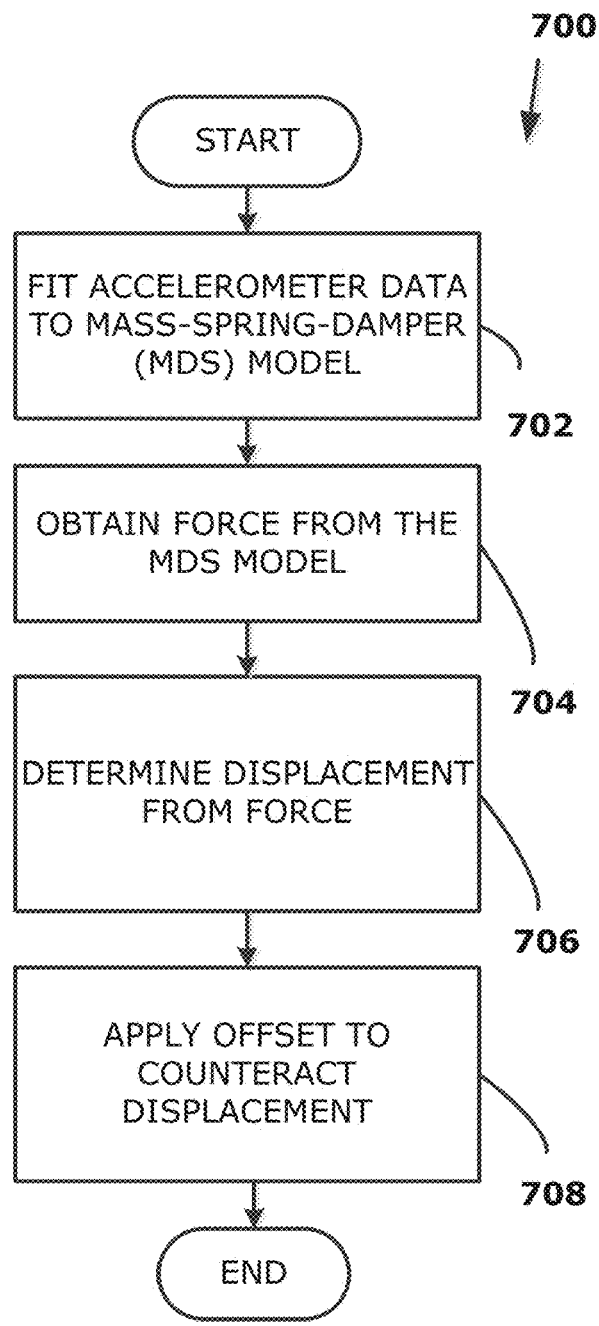
FIG. 7 is a flowchart that details a method of stabilizing content display on a wearable device by generating an offset that compensates for the displacement of the display screen due to the oscillating motion of the wearer in accordance with some embodiments.

FIG. 7 is a flowchart 700 that details a method of stabilizing content display on a wearable device by generating an offset that compensates for the displacement of the display screen 280 due to the oscillating motion of the wearer 102 in accordance with some embodiments. The method begins at 702 wherein the accelerometer data is fit to the mass-spring-damper (MDS) model. In some embodiments, the wearer's arm 110 that bears the wearable device 104 is modeled as a single spring in two dimensions, x and y. Eq. (1) describes the motion in such a system in the x-direction which can also be generalized to the y-direction. As described herein, from Eq. (1), $M\, d^2x/dt^2$—the driving force can be determined at 704. The displacement of the display screen x(t) due to the force can be determined at 706. At 708, an equal offset in the opposite direction −x(t), can be applied to the display screen 280 to counter the displacement of the content display due to the oscillatory forces acting on the wearable device 104.

Figure 8:
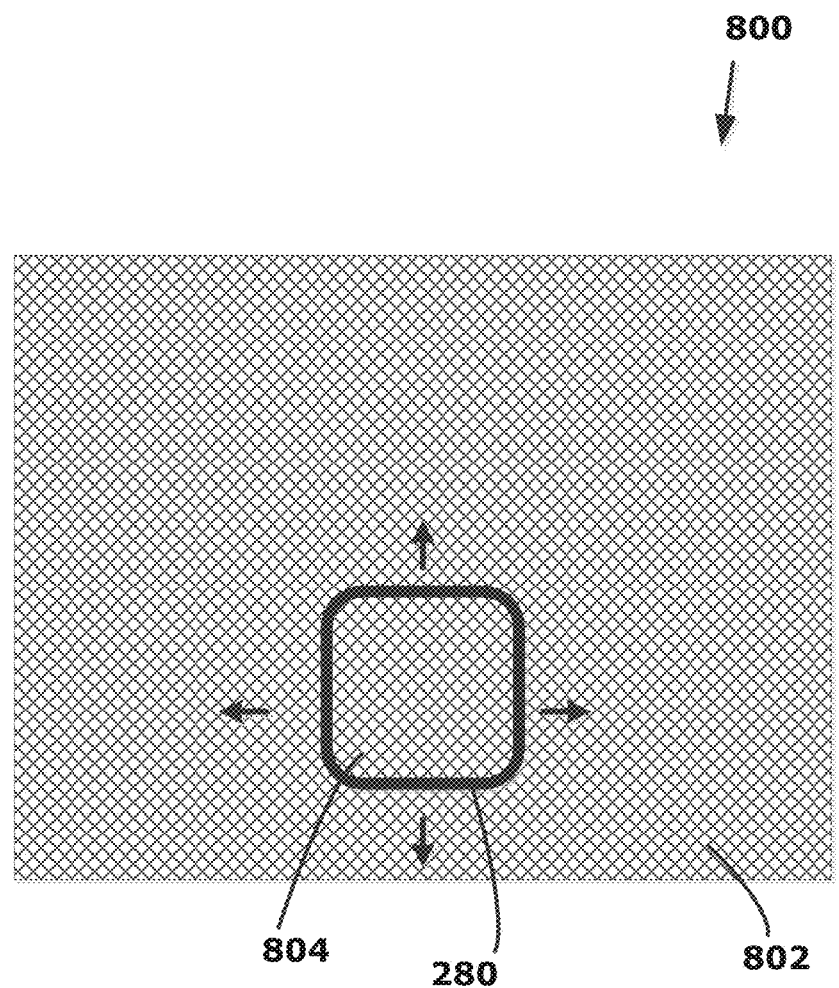
FIG. 8 is an illustration of a peephole display implemented on the wearable device in accordance with some embodiments.

While one or more of the methodologies discussed herein can be applied, the combination of smoothing of the acceleration with the offsets to counter the noise in the accelerometer data and with further offsets to counter the oscillatory accelerations provides stabilization to the content display on the wearable device 104 thereby increasing its readability to the wearer 102 in motion. Moreover, the methods described herein afford implementing peephole displays on the wearable device 104 as shown in the illustration 800 of FIG. 8. Applications may have large area of content 802 only a portion 804 of which is revealed on the displays screen 280. As the wearable device 104 moves around, the content stays affixed and anchored causing the screen to act as a window onto a fixed background. Since little motions and accelerations on the wearable device 104 occur involuntarily, for example, when jogging or walking, parts of the content 802 lying outside the current content display 804 can be revealed with each displacement in one or more of the directions thereby increasing the area visible to the wearer 102 on the wearable device 104.

Peephole display implementation can work on wearable devices in accordance with embodiments described herein because wearable oscillations tend to be rapid (~100 Hx), which is faster than the threshold for typical human persistence of vision: the user's perception of the content display, which typically operates on the timescale of around 25 Hz.

Figure 9:
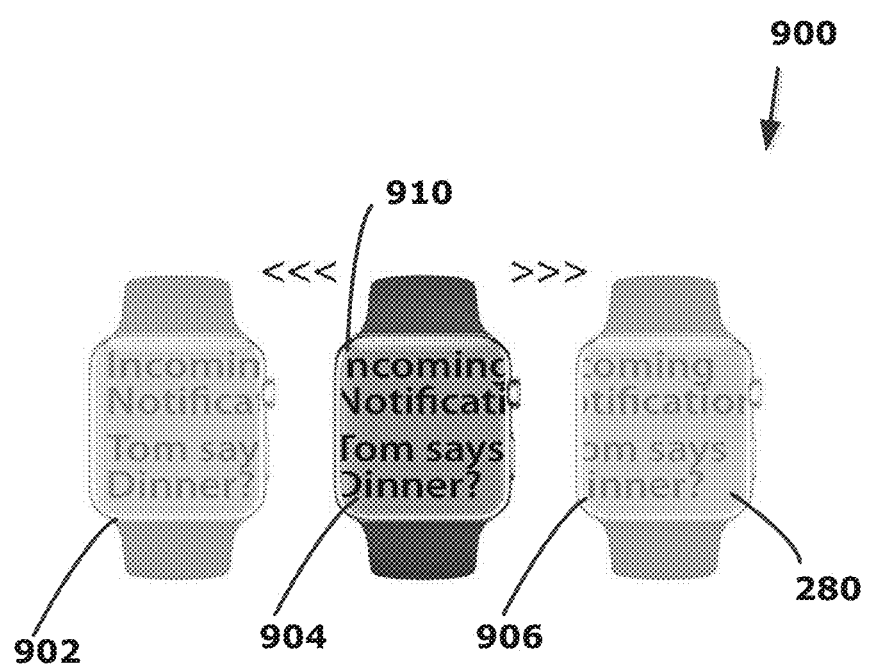
FIG. 9 is an illustration that shows another implementation of the peephole display that enables enhancing readability of notifications presented on the wearable device in accordance with some embodiments.

FIG. 9 is an illustration 900 that shows another implementation of the peephole display that enables enhancing readability of notifications presented on the wearable device in accordance with some embodiments. The notifications can be those generated within the wearable device 104 itself such as alarms, calendar reminders and the like or they may be notifications such as emails, instant messages, phone calls that arise via the networks such as the Internet or the mobile data networks. For example, the notification 910 arises from one of the Internet or the mobile data networks and relates to a dinner invitation from a contact. Three frames 902, 904 and 906 of a notification 910 are shown wherein no one frame reveals the entire notification at one time. However, the movement of the wearable device 104 towards the left and right sides can reveal the off screen portions of the notification as shown at 902 and 906. The three images 902, 904 and 906 merge into an overall image in the wearer's 102 vision thereby comprehensively conveying the message in the notification.

It may be appreciated that the wearer 102 does not need to explicitly move the wearable device 104 to reveal the off-screen parts. Since, involuntary motion occurs as detailed herein, such as when walking or jogging, the resulting micro-motions and accelerations cause the contents of the notification 910 to move into the center of the display screen 280 naturally without any explicitly required interactions from the wearer 102. Moreover, the text is initially cropped at 902, for example, as a result of zooming the contents. However, the entire content of the notification 910 is generally not necessary for the wearer 102 to understand its message. The middle screen 904 shows a nearly complete version with hints of the letters that are cut off from the view. As the wearer 102 may have seen the words many times earlier, their vision system guesses and completes the rest thereby enabling an understanding of the message with a quick glance even when in motion.

Figure 10:
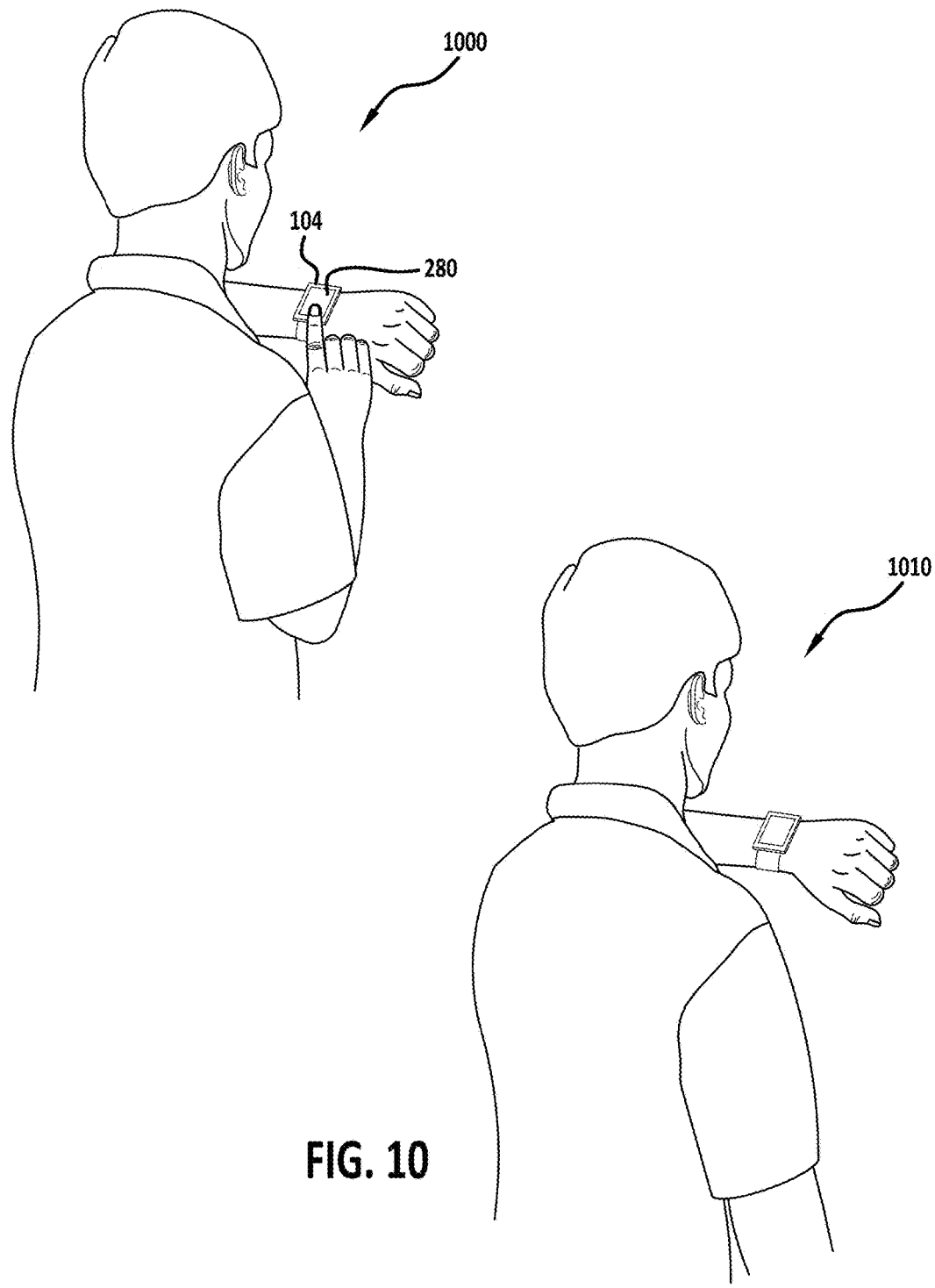
FIG. 10 is an illustration that shows a two-handed user interaction in accordance with some embodiments.

FIG. 10 is an illustration 1000 that shows a two-handed user interaction in accordance with some embodiments. In the illustration 1000 the user interacts with the wearable device 104 that allow for example, wrist and finger input in the z-dimension which is normal to the x-y plane that lies along the display screen 280. Accelerometer data indicates that generally the acceleration components along z-axis are stable and smooth when compared to the x and y axes. This makes interactions in z easy to control for the user and reliable to detect by the command execution module 208. The touch input of the user along the z-axis serves to provide the start and the end of an input gesture occurring on the x-y plane. When the user wants to interact with a document, for example, zooming it in the virtual view, he touches the display screen 280 with his finger and moves the watch towards or away from his face which signals the processor to zoom in or out accordingly. A single-handed gesture as shown at 1010 can also be contemplated in some embodiments. If a robust detection of delimiters to determine the beginning and end of a z-dimension gesture is provided for example, via voice input, the use of the second hand can be eliminated. The user interacts with the z-dimension directly by moving only the hand wearing the device.

Figure 11:
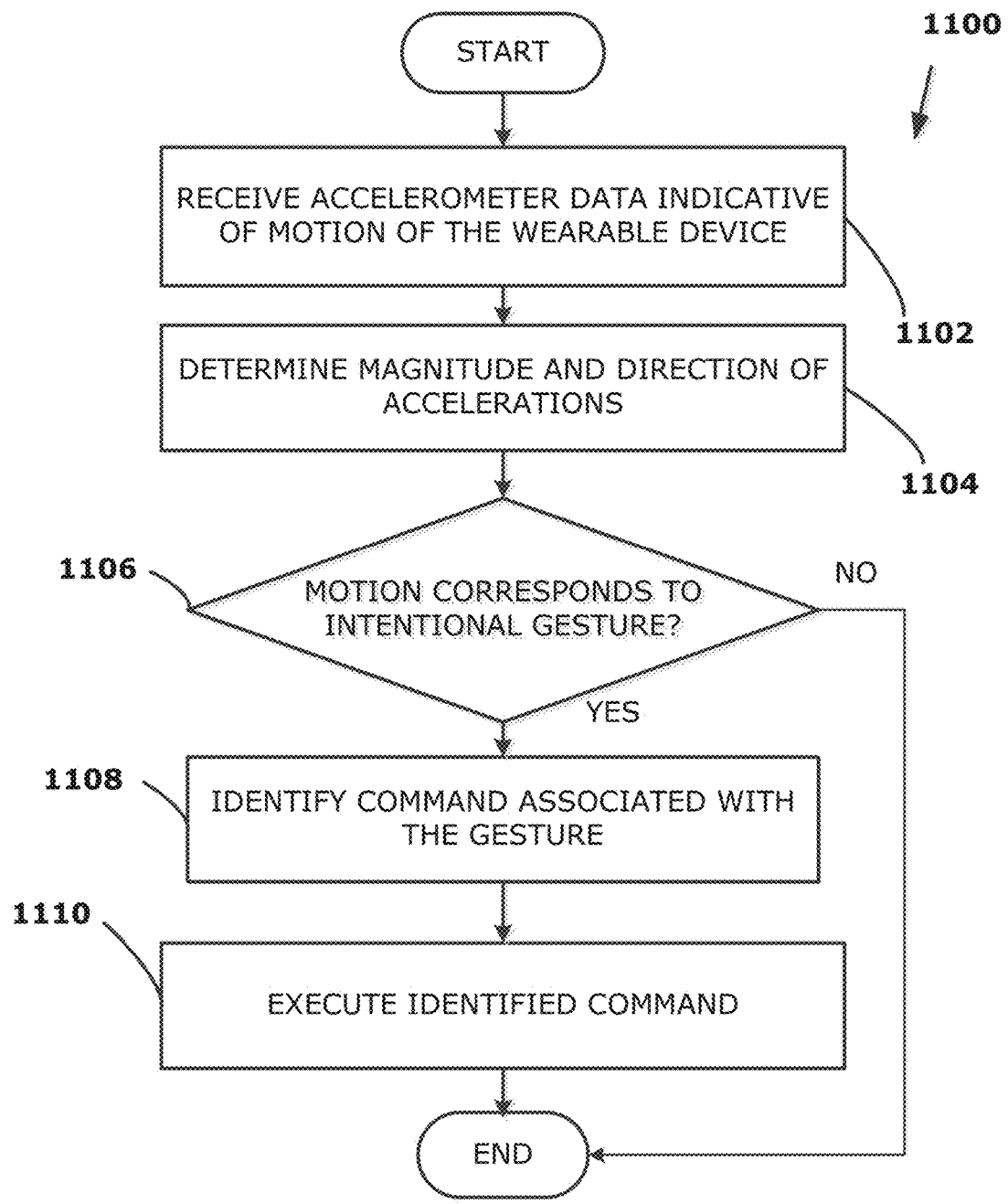
FIG. 11 is a flowchart that details a method of executing tasks based on identifying intentional user gestures in accordance with some embodiments.

FIG. 11 is a flowchart that details a method of executing tasks based on identifying intentional user gestures in accordance with some embodiments. The method begins at 1102 wherein accelerometer data is received. At 1104, the magnitude and direction of accelerations is determined from the accelerometer data. It is determined at 1106 if the motion detected via the accelerometer data corresponds to an intentional user gesture. For example, when spikes that signal very rapid accelerations are detected such data can be indicative of intentional user input. If it is determined at 1106 that the input corresponds to intentional user gesture, a command associated with such gesture is identified at 1108 and executed at 1110. By the way of non-limiting examples, the command can comprise one of a change-display command wherein the display is changed to show certain off screen portions of the peephole display when the wearer 104 jerks the hand 110. Another non-limiting example can comprise a snooze-alarm command wherein an alarm is snoozed/dismissed when the wearer 104 executes a sharp gestured with the hand 110. Yet another non-limiting example can comprise moving the hand 110 up/down to zoom-in or out on the content display. However, if it is determined at 1106 that the input from the accelerometer data is not intentional user gesture, the process terminates on the end block.

Figure 12:
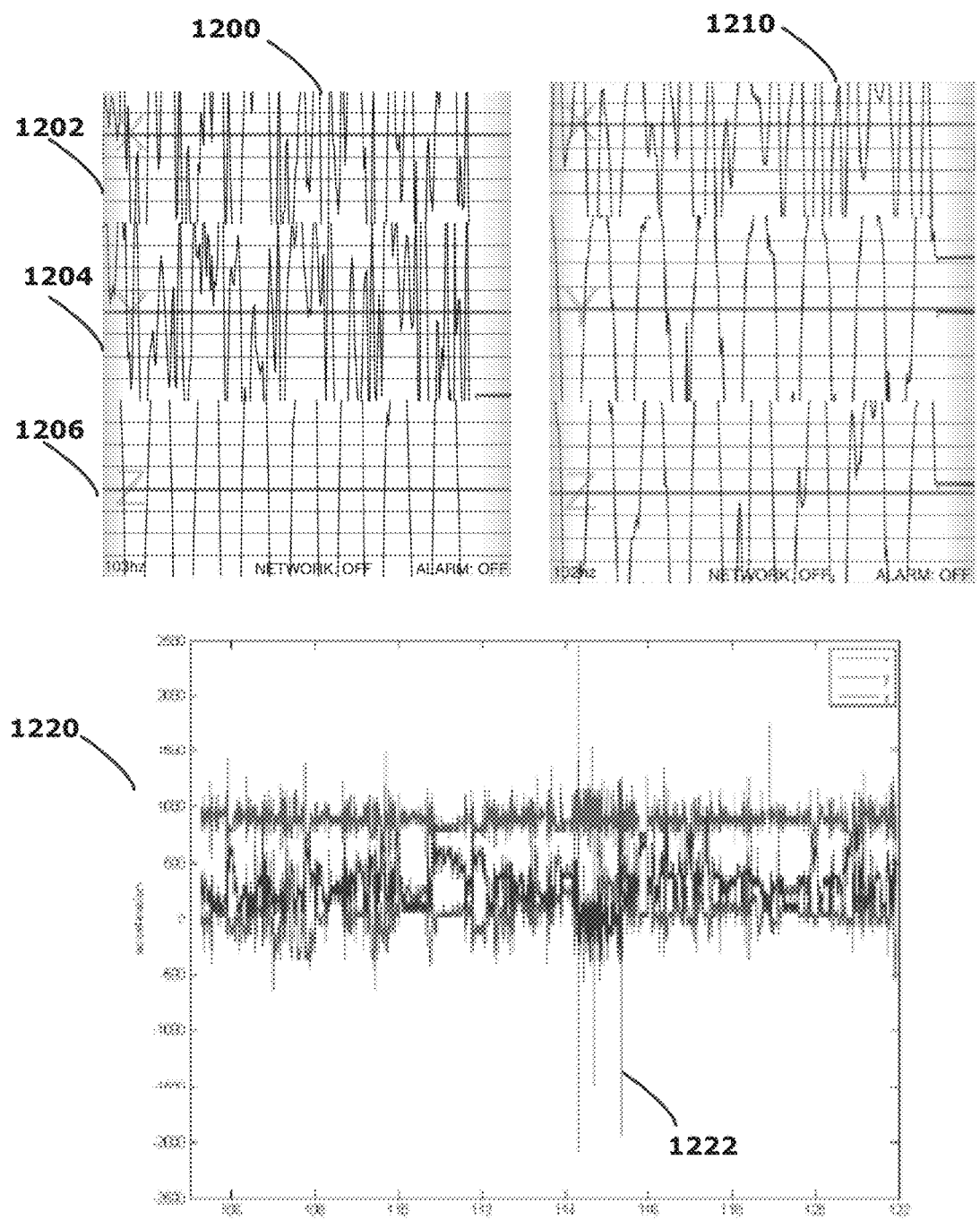
FIG. 12 is an illustration that shows accelerations measured for different wearer motions.

FIG. 12 is an illustration that shows accelerations measured for different wearer motions. The pattern 1200 shows accelerations measured on a wrist-mounted device when walking and holding up. The pattern 1210 shows accelerations measured on a hand-held device in a similar position when walking at an accelerated pace. The curves shown at 1202 measures accelerations along the X-axis, the curves at 1204 shows the accelerations along the Y-axis and the curves at 1206 shows the accelerations on the Z-axis. It may be noted that accelerations 1200 in the wrist-worn device have greater jitter when compared to the accelerations 1210 in the hand-held device. Hence, a display stabilization module 100 described in accordance with embodiments herein can help stabilize content displays on such wearable devices. Moreover, it may be noted that accelerations along the Z axis in both the cases are smoother when compared to the accelerations along the X and Y axes. This enables implementation of user interactions along the Z axis as described herein. Further accelerometer data is shown at 1220 which shows sudden spikes 1222 indicative of sharp user gestures.

The command execution module 208 comprised in the display stabilization module 100 can be configured to recognize such sudden spikes to execute predetermined actions such as but not limited to dismissing an alarm or notification, changing a view to move to the next notification and zooming in/out of a view.

For the purposes of this disclosure a computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), program logic, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method, comprising:
   receiving, by a processor, data indicative of motion from a motion sensor of a wearable computing device mounted on a body portion of a wearer, the wearable computing device further comprising a display screen;
   detecting from the motion sensor data, by the processor, prospective acceleration of the computing device displaying at least a first portion of a content display on the display screen;
   determining, by the processor based on the motion sensor data, a perspective transformation for the content display to apply inversely to a displacement of the display screen relative to the wearer's view due to the prospective acceleration, the perspective transformation comprising an offset displacement indicating a magnitude and a direction based at least on the detected prospective acceleration;
   stabilizing, by the processor, the content display on the display screen by smoothing noise in the motion sensor data;
   dragging, by the processor, a first content display portion by the offset in the indicated direction, the first content display portion being relocated proximate to a center of the display screen as a result of the dragging;
   further detecting, by the processor, a first oscillatory motion of at least the body portion bearing the wearable computing device thereon;
   analyzing, by the processor, the first oscillatory motion based on a mass-spring-damper model comprising at least one spring, a current position indicative of a displacement from a mean position of the at least one spring, the at least one spring modeling the body portion; and
   stabilizing, by the processor, the first content display portion based on said analysis.

2. The method of claim 1, determining the magnitude of the offset further comprises: applying, by the processor, a constant spring factor as at least a portion of the offset.

3. The method of claim 1, wherein determining the magnitude for an offset further comprising:
   setting, by the processor, the magnitude for the offset based on a displacement of the at least one spring relative to the mean position; and
   mapping, by the processor, the offset onto an off screen distance for providing continuous stabilization throughout the amplitude of the first oscillatory motion.

4. The method of claim 1, the dragging of the first portion of the content display causes display of a second portion of the content display on the display screen.

5. The method of claim 4, dragging the content display by the offset in the indicated direction further comprises: altering, by the processor, a display on the display screen from the second portion of the content display to the first portion of the content display.

6. The method of claim 5, the first portion of the content display and the second portion of the content display comprise a complete display of a notification.

7. The method of claim 1, wherein dragging, by the processor, the first content display portion by the offset in the indicated direction is based on hysteresis.

8. The method of claim 7, wherein the first content display is offset by a fraction of a difference to a prior offset.

9. The method of claim 8, the offset of the first content display is updated at a refresh rate of the motion sensor data.

10. An apparatus comprising:
a processor;
a display screen; and
a non-transitory processor readable storage medium having stored thereon programming logic, the programming logic comprising:
motion sensor data receiving logic, executed by the processor, to receive data indicative of motion from an motion sensor of the apparatus mounted on a body portion of a wearer;
detecting logic, executed by the processor, to detect from the motion sensor data, prospective acceleration of the apparatus displaying at least a first portion of a content display on a display screen;
transformation logic, executed by the processor, to determine based on the motion sensor data a perspective transformation of the content display to apply inversely to a displacement of the display screen relative to the wearer's view, the perspective transformation comprising an offset displacement indicating magnitude and direction based at least on the detected prospective acceleration;
stabilizing logic, executed by the processor, to stabilize the content display on the display screen by: smoothing, by the processor, noise in the motion sensor data;
dragging logic, executed by the processor, to drag a first content display portion by the offset in the indicated direction, the first content display portion being relocated proximate to a center of the display screen as a result of the dragging;
oscillatory motion detecting logic, executed by the processor, to detect a first oscillatory motion of at least the body portion bearing the wearable computing device thereon;
oscillatory motion analyzing logic, executed by the processor, to analyze the first oscillatory motion based on a mass-spring-damper model comprising at least one spring, a current position indicative of a displacement from a mean position of the at least one spring, the at least one spring modeling the body portion; and
stabilizing logic, executed by the processor, to stabilize the first content display portion based on said analysis.

11. The apparatus of claim 10, the offset determining logic further comprises: logic, executed by the processor, for applying a constant spring factor as at least a portion of the offset.

12. The apparatus of claim 10, wherein offset determining logic further comprises:
setting logic, executed by the processor, for setting the magnitude for the offset based on a displacement of the at least one spring relative to the mean position; and
mapping logic, executed by the processor, for mapping the offset onto an off screen distance for providing continuous stabilization throughout the amplitude of the first oscillatory motion.

13. A non-transitory computer readable storage medium, comprising processor-executable instructions for:
receiving data indicative of motion from an motion sensor of a wearable computing device mounted on a body portion of a wearer, the wearable computing device further comprising a display screen;
detecting from the motion sensor data, prospective acceleration of the computing device displaying at least a first portion of a content display on the display screen; and
determining a perspective transformation to apply inversely to a displacement of the display screen relative to the wearer's view, the perspective transformation comprising an offset displacement indicating magnitude and direction based at least on the detected prospective acceleration;
stabilizing the content display on the display screen by smoothing noise in the motion sensor data;
dragging a first content display portion by the offset in the indicated direction, the first content display portion being relocated proximate to a center of the display screen as a result of the dragging;
further detecting a first oscillatory motion of at least the body portion bearing the wearable computing device thereon;
analyzing the first oscillatory motion based on a mass-spring-damper model comprising at least one spring, a current position indicative of a displacement from a mean position of the at least one spring, the at least one spring modeling the body portion; and
further stabilizing the first content display portion based on said analysis.

14. The non-transitory storage medium of claim 13, the instructions for determining the magnitude of the offset further comprise instructions for: applying a constant spring factor as at least a portion of the offset.

15. The non-transitory storage medium of claim 13, the instructions for determining the magnitude for an offset further comprising instructions for:
setting the magnitude for the offset based on a displacement of the at least one spring relative to the mean position; and
mapping the offset onto an off screen distance for providing continuous stabilization throughout the amplitude of the first oscillatory motion.

* * * * *